April 21, 1970 G. TRAUTWEIN 3,508,077
ARRANGEMENT FOR ELECTRONIC FEEDING-IN REPORTING
PULSES INDICATING THE CONTACT POSITION OF
SWITCHES IN TELECONTROL SYSTEMS
Filed July 5, 1967 3 Sheets-Sheet 1

INVENTOR
G. TRAUTWEIN
BY D. P. Warner
ATTORNEY

BY 3,508,077

ARRANGEMENT FOR ELECTRONIC FEEDING-IN REPORTING PULSES INDICATING THE CONTACT POSITION OF SWITCHES IN TELECONTROL SYSTEMS

Gustav Trautwein, Pforzheim, Germany, assignor to International Standard Electric Corporation, New York, N.Y., a corporation of Delaware Filed July 5, 1967, Ser. No. 651,302
Claims priority, application Germany, July 19, 1966, St 25,658
Int. Cl. H03k 5/20
U.S. Cl. 307—236 4 Claims

ABSTRACT OF THE DISCLOSURE

An arrangement is provided for remotely indicating changes in the contact position of telecontrol switches while eliminating undesirable transient signals which otherwise may cause a false indication. A differentiator provides a pulse whenever a contact either opens or closes. The pulse is transmitted to an OR-circuit via separate leads depending on the polarity. A low-pass filter following the OR-circuit flattens the leading edge of the differentiated pulses and in the process suppresses interfering transient signals which could otherwise cause a signal transmitter to operate and to falsely indicate a change in the switches.

The invention relates to an arrangement for shaping pulses and eliminating extraneous pulse-like signals. The arrangement has direct application to reporting the contact position of switches in telecontrol systems.

It is known for telecontrol systems serving to transmit commands or reports serving to transmit commands or reports indicating the contact position of a switch that facilities are necessary which can recognize any changes of the contact positions. When such changes occur a transmitter is set to emit a pulse indicating the change in contact positions. The thereto necessary systems in which a starting criterion is obtained, e.g. by interlock contacts, transformers or relay combinations have the drawback that ambient influences such as dust and chemicals on the contacts are disadvantageous for the functioning. The systems hitherto known provide only a little security against interference and are, moreover, much too expensive for the present day electronic telecontrol equipment.

An arrangement is made by embodiments of the present invention for electronic feeding-in of pulses in telecontrol systems to indicate the contact position of the switches in which a differentiating element renders a positive pulse when the contact opens and a negative pulse when the contact closes and this pulse is led to an OR-circuit via separate lines. The above-mentioned disadvantages are avoided by use of a low-pass filter, following said OR-circuit which serves to flatten the front edge of the differentiated pulses.

The invention is in detail explained with the aid of the accompanying drawings, wherein.

Figure 1:
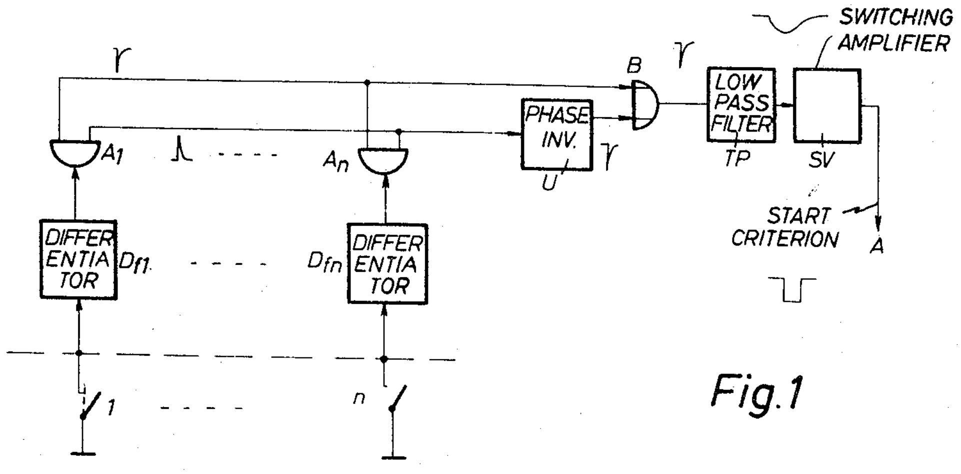
FIG. 1 shows a block diagram of an arrangement according to the invention.

According to FIG. 1 the contacts 1 . . . $n$ represent the interlock contacts of the system to be supervised.

They can open or close independently of each other, and either simultaneously or successively. At any arbitrary switching of the contacts 1 . . . $n$ a criterion (e.g. a pulse) must appear at the output of the circuit arrangement A. Contacts kept closed or open do not influence the function of switching contacts.

If a contact is opened a negative voltage surge occurs at the input of its pertinent differentiating element $D_f$ ($D_{f1} \ldots D_{fn}$), appearing at the output as a negative pulse with steep front edge and with an exponentially dropping trailing edge. The pertinent successive circuit arrangement A ($A1 \ldots A_n$) determines on which collective line 2 or 4 the pulse is advanced. Negative pulses are directly led to the OR-circuit B over line 2.

If one of the interlock contacts 1 . . . $n$ closes, a positive voltage surge occurs at the input of the pertinent differentiating element. After differentiation this positive pulse is led to a phase inverter stage U via a collective line 4. A negative voltage surge appears then at the OR-circuit B.

With a low-pass filter TP following the OR-circuit B the inventive function of suppression of interfering pulses is met. The distance between the interlock contacts and the feeding-in circuits may be up to several hundred meters. On these lines interfering voltages may occur inductively or capacitively according to FIG. 2. If the following switching amplifier SV has a negligible response period, which is true in most cases for electronic switches like Schmitt-triggers, all interfering pulses having a higher amplitude than the one of its responding threshold according to the diagram in FIG. 2, would provide a starting criterion, thus erroneously initiating the operation of a telecontrol transmitter.

The low pass filter TP flattens the steep front edge of the differentiated pulse. The voltage function resulting from the time constant of the differentiating element and the time constant of the low-pass filter TP (see FIG. 2) causes a response delay $\tau_a$ according to FIG. 2 for the switching amplifier SV. Consequently, all interfering voltages below a defined amplitude are suppressed.

Figure 2:
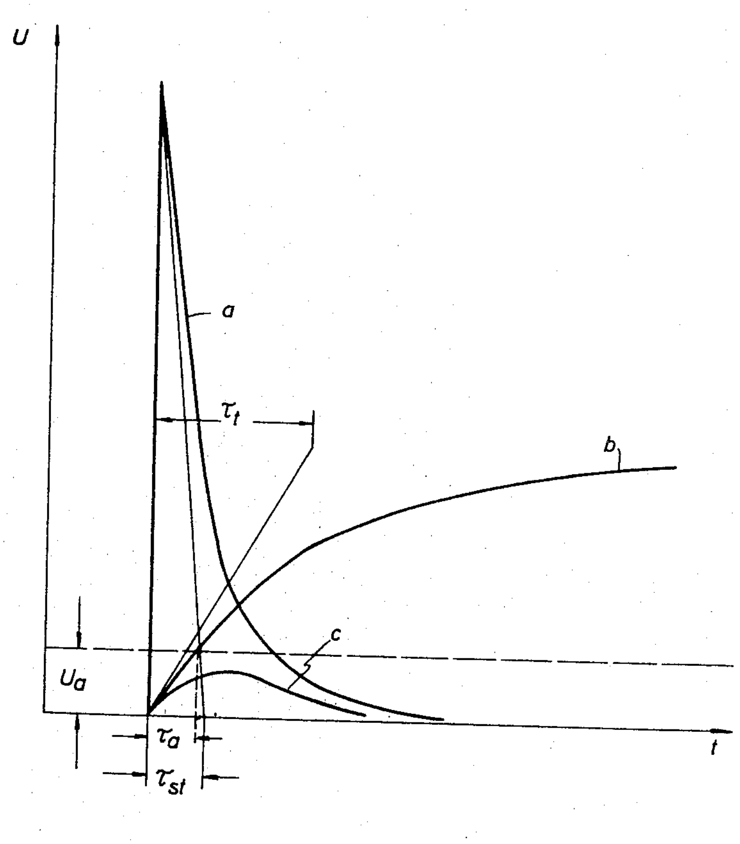
FIG. 2 shows a diagram of a curve which is characteristic of an interfering pulse.

In the diagram of FIG. 2, the curve of the voltages in case of an interfering pulse is shown. The curve $a$ represents the voltage characteristic of an interfering pulse, the curve $b$ the transient function of the low-pass filter TP. The curve $c$ shows the voltage characteristic $u_T$ at the input of the amplifier SV; $\tau_t$ represents the time constant of the low-pass filter TP and $\tau_{st}$ the time constant of the interfering voltage, $u_a$ is the responding threshold of the switching amplifier.

Figure 3:
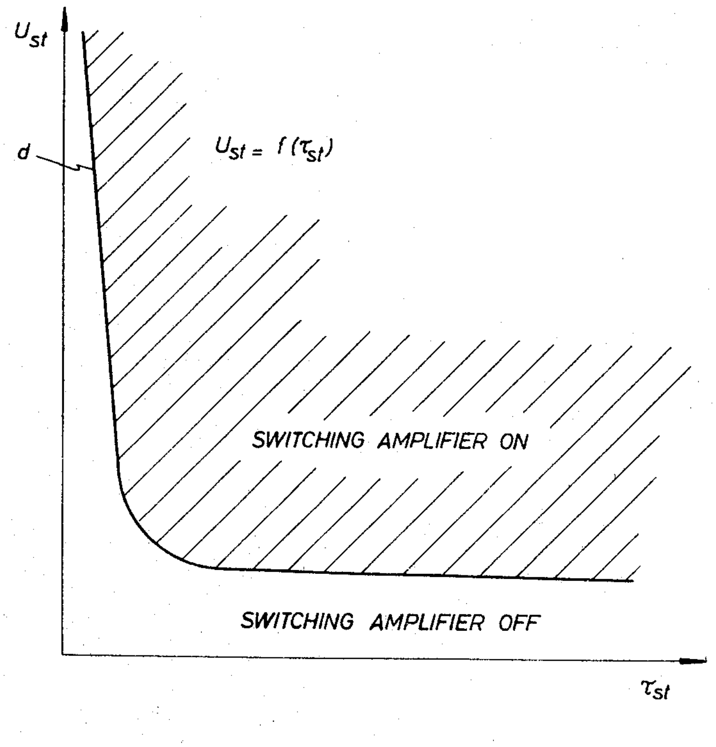
FIG. 3 represents the effect obtained with interference suppression according to the invention.

FIG. 3 shows the connections between the interfering amplitude and the interfering time constant. At interfering voltages, the amplitude and time constants of which are below the curve $d$, the switching amplifier does not respond.

Figure 4:
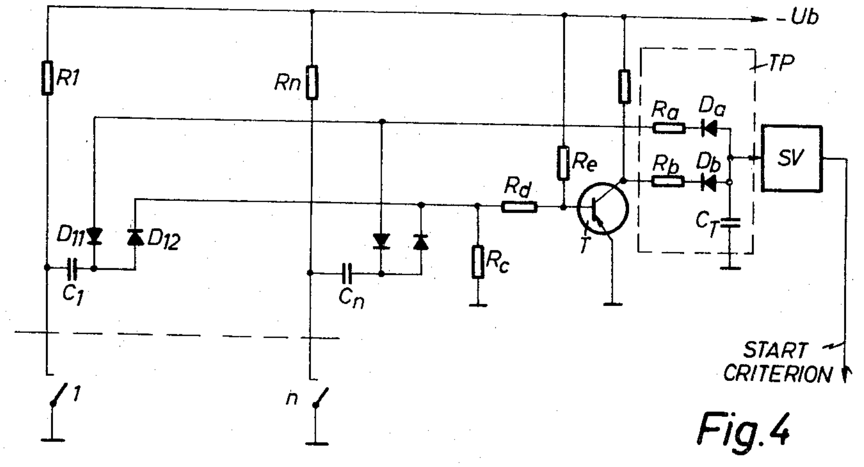
FIG. 4 shows an example of a circuit arrangement according to the invention.

In the example, according to FIG. 4 the differentiating element $D_{f1}$ (FIG. 1) is formed by the capacitor $C_1$ with a succeeding resistance network, substantially consisting of the respective resistances of the diodes and the impedance of the transistor T. The circuit arrangement $A_1$ in FIG. 1 consists of the diodes $D_{11}$ and $D_{12}$. The phase inverter stage U in FIG. 1 is shown in FIG. 4 by the transistor T and the preceding resistors $R_c$, $R_d$, $R_e$. The OR-circuit B and the low-pass filter TP in FIG. 1 corresponds to the elements in FIG. 4, shown within dotted lines, viz. $R_a$, $R_b$, $D_a$, $D_b$, $C_T$.

While the principles of the invention have been described above in connection with specific apparatus and applications, it is to be understood that this description is made only by way of example and not as a limitation on the scope of the invention.

What is claimed is:

1. An arrangement for providing reporting pulses indicative of changes in the positions of switching contacts, wherein the improvement comprises:
 means providing a pulse when switching contacts open and when they close,
 a differentiating circuit responsive to a pulse to provide a sharp positive pulse and a sharp negative pulse,
 a circuit for receiving said sharp positive and negative pulses and applying each to a separate line,
 an OR-circuit connected directly to one of said lines and responsive to a sharp pulse to provide a new pulse, and
 a low-pass filter connected to said OR-circuit to receive said new pulse and provide an output pulse having a flattened leading edge,
 said low-pass filter serving to suppress interfering pulses which could provide an unintended indication of a change in state of the switching contacts.

2. An arrangement as claimed in claim 1, in which the means providing a pulse provides a negative pulse when a contact is opened and a positive pulse when a contact is closed.

3. An arrangement as claimed in claim 1, in which the OR-circuit is directly responsive to a negative going sharp pulse to provide a new pulse.

4. An arrangement as claimed in claim 1, and including
 a phase inverter connected to receive said positive going sharp pulses and convert them to negative going sharp pulses,
 means connecting said phase inverter to said OR-circuit to apply the negative going sharp pulses from said phase inverter to the input of the OR-circuit and provide a new pulse.

References Cited

UNITED STATES PATENTS

| | | | |
|---|---|---|---|
| 3,018,442 | 1/1962 | Goodman | 328—127 X |
| 3,062,973 | 11/1962 | Shea | 307—218 X |

DONALD D. FORRER, Primary Examiner

R. C. WOODBRIDGE, Assistant Examiner

U.S. Cl. X.R.

307—218, 231; 328—57, 118, 127, 165; 340—256